United States Patent [19]

Kvols

[11] Patent Number: 5,116,299

[45] Date of Patent: May 26, 1992

[54] FASTENING SYSTEM FOR MEMBERS OF A FRAMEWORK

[76] Inventor: Kevin Kvols, 213 Aspen Garden Way, Suite 100, Woodland Park, Colo. 80863

[21] Appl. No.: 796,396

[22] Filed: Nov. 22, 1991

[51] Int. Cl.⁵ .............................................. F16B 7/08
[52] U.S. Cl. .................................. 403/187; 403/403; 403/170
[58] Field of Search ............... 403/175, 174, 178, 190, 403/199, 403, 187, 189

[56] References Cited

U.S. PATENT DOCUMENTS

| 3,778,175 | 12/1973 | Zimmer | 403/187 |
| 3,969,031 | 7/1976 | Kroop | 403/178 X |
| 4,360,285 | 11/1982 | Magness | 403/187 |

Primary Examiner—Andrew V. Kundrat
Attorney, Agent, or Firm—Richard W. Hanes

[57] ABSTRACT

A fastening system for making right angle interconnections between first and second rigid structural components of a framework, each having at least two flat mutually parallel sides and each carrying a track. A "U"-shaped connector having a flat base and mutually parallel upright stems is disposed so that the base of the connector engages one of the tracks of the first frame member and the upright stems engage the respective tracks of the second frame member.

5 Claims, 2 Drawing Sheets

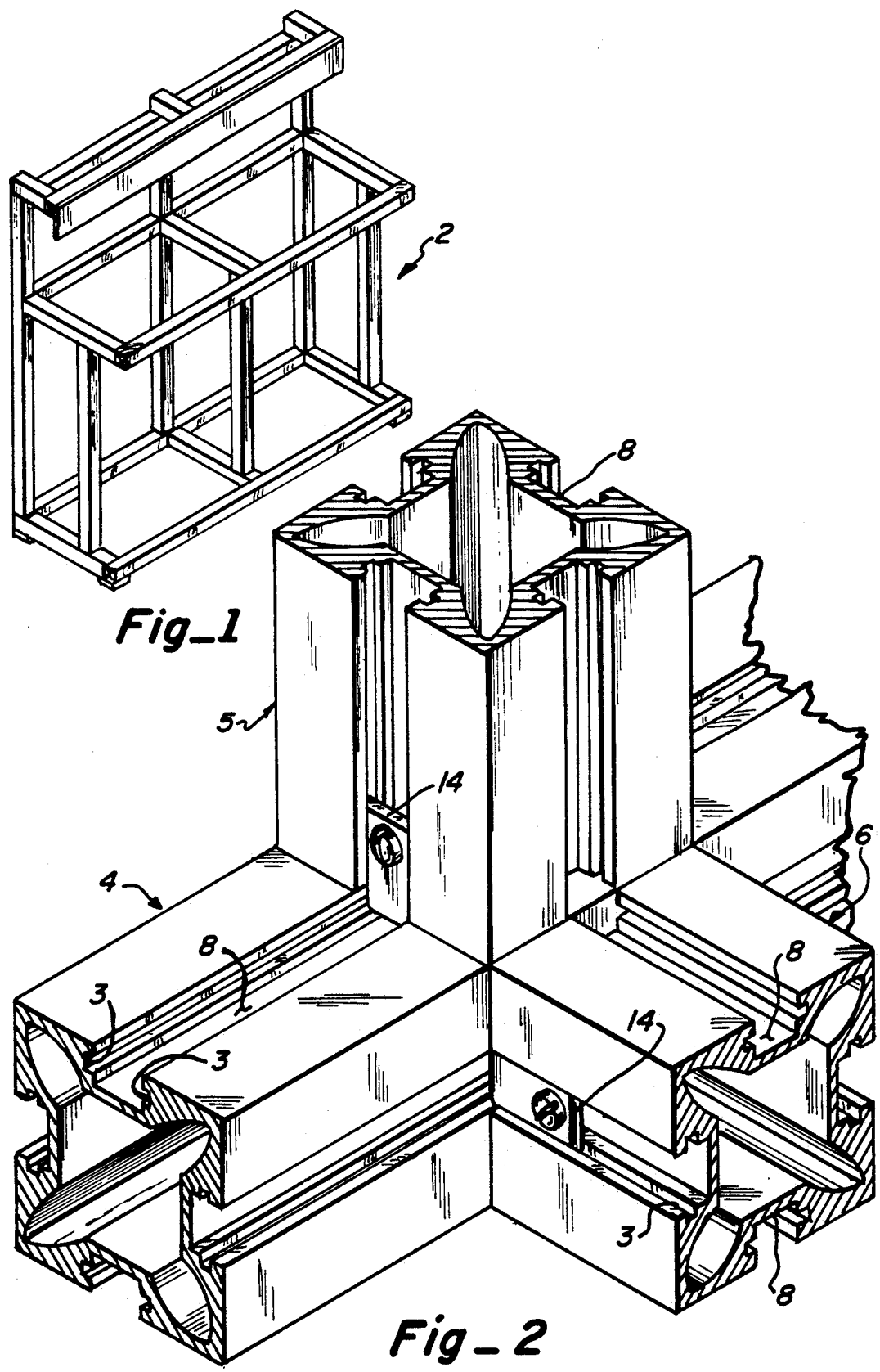

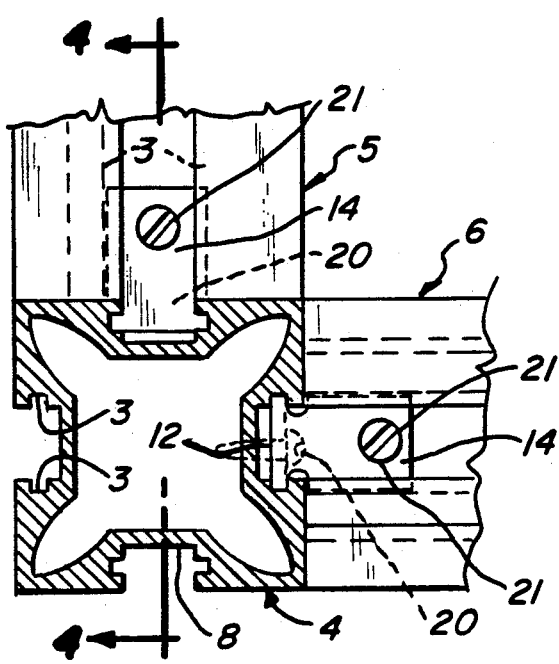
Fig_3
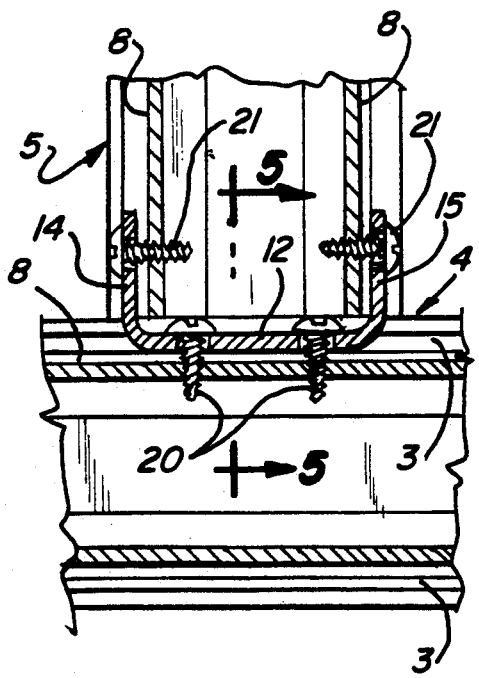
Fig_4
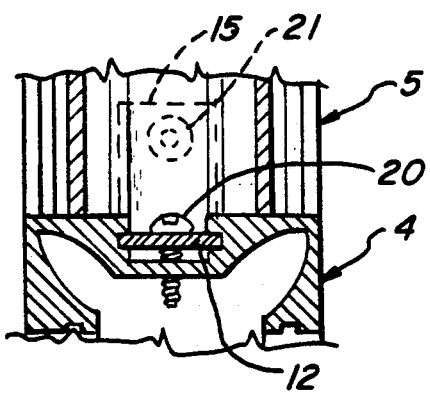
Fig_5
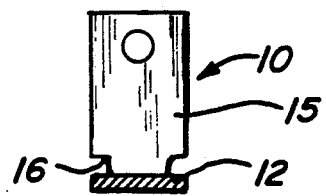
Fig_7
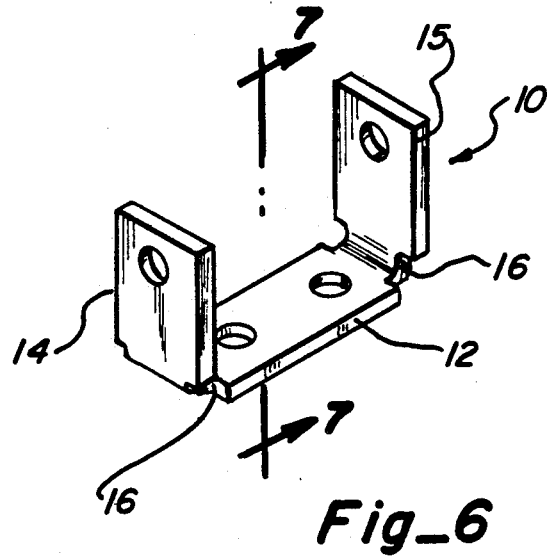
Fig_6

5,116,299

FASTENING SYSTEM FOR MEMBERS OF A FRAMEWORK

The present invention relates generally to a device for interconnecting the members of a rigid framework and more specifically to apparatus for implementing a connection between the members of a framework which are interconnected at right angles.

BACKGROUND OF THE INVENTION

Many products which require rigid framing members to support a wall or other type of load are constructed with rods, rails, tubes, channels or some other type of metal beam. In each of these applications there is always the need to bond or attach these members together at right angles, that is, abut the end of one member against the side of another and form an attachment Welding, or a similar type of permanent bond, is unsatisfactory where the frame is transported in a knocked down form to be assembled on site, such as for example, the framework for office partitions or the framework for a retail store product display. The ease or difficulty of the fastening problem is often related to the shape or structural configuration of the beams to be interconnected and the structural strength required of the finished assembly.

The prior art has seen the traditional use of straps and angles, in addition to the use of screws and bolts but all of these devices are limited to certain beam configurations, such as solid material beams. The use of straps or angles results in discontinuities in the surfaces of the beams.

It is therefore the primary object of the present invention to provide a system for interconnecting the beams of a framework at right angles which will provide maximum strength and will function with hollow tubing as well as with sold beam members.

A second object of the invention is to provide a fastener which may be applied to a beam member anywhere along its length by sliding the actual connector along a track which is constructed as an integral part of the beam.

Another object of the invention is to provide a frame member connector which will be located below the surface of the beams so as not to present discontinuities or irregularities in the surface of the beams.

Other and further objects, features and advantages of the fastening system of the present invention will become apparent upon a reading of the following detailed description of a preferred form of the invention, taken in connection with the accompanying drawing in which:

FIG. 1 is a perspective view of the framework of a product display rack constructed in accordance with the teachings and apparatus of the present invention.

FIG. 2 is an enlarged fragmentary perspective view of three extruded frame embers joined at right angles by the connecting system of the present invention.

FIG. 3 is a fragmentary end view of a first extruded frame/beam member showing abutting beam members connected to the top and one side of the first member, as was shown in FIG. 2.

FIG. 4 is a fragmentary cross sectional view taken along lines 4—4 in FIG. 3.

FIG. 5 is a fragmentary cross sectional view taken along lines 5—5 in FIG. 4.

FIG. 6 is a perspective view of the fastening clip of the present invention.

FIG. 7 is a cross sectional view of the fastening clip, taken along lines 7—7 of FIG. 6.

SUMMARY OF THE INVENTION

The present invention pertains to a fastening system for making right angle interconnections between rigid structural components of a framework. The beams which are typically involved in structures to which the invention would best apply are hollow rectangular tubes having flat mutually parallel opposed sides, each having a longitudinal subsurface track for the purpose of slidingly carrying a portion of a connector. The connector for this purpose is a metal ribbon having a "U"-shape with a flat base and two mutually parallel upright stems. In connecting position, the connector is disposed so that the base of the connector engages the track in one of the sides (facing side) of a frame member and the upright stems engage both of the opposing tracks of the frame member which is to abut the facing side of the first mentioned frame member. Once the precise position of the interconnection is determined the connector is attached to the beams being interconnected with screws through pre-drilled holes in the connectors.

DETAILED DESCRIPTION OF PREFERRED EMBODIMENT

Illustrated in FIG. 1 is a typical product display rack 2 constructed with a framework of rigid beams which must be solidly interconnected at the joints where the flush end of one beam abuts at right angles the side of another similar beam. Such a framework could support a multitude of different kinds of products and take an infinite number of configurations. One particularly applicable use of a product rack constructed with the beams and attaching clips of the present invention and similar in design to the rack 2 shown in FIG. 1 is for the support and display of filled fish aquariums, which are heavy and require an extremely stable platform.

FIGS. 2 and 3 illustrate three extruded framing beams 4, 5 and 6, interconnected according to the present invention, forming a typical intersection in a framework usable for creating a multitude of various assemblies. The beams 4, 5 and 6 are constructed by extruding aluminum into a tubular shape with a rectangular outer profile, displaying parallel opposing sides. A subsurface track 3 is formed in each of the beam sides to provide a keyway, slot or engagement anchor with the "U"-shaped connector 10 seen separately in FIGS. 6 and 7. The track 3 is formed with a pair of opposing slots in the side walls of a channel whose floor is depicted with reference numeral 8. The channel and the track slots 3 extend longitudinally along the center of each flat side of the beams.

The connector 10 is made of a segment of ribbon metal and is formed into a "U"-shape, having a flat base 12 and two mutually parallel stems 14 and 15 bent upwardly from the base. At the point of the perpendicular bend on each side of the base 12 there is a notch 16 relieved from each edge of the ribbon material to provide clearance for the protrusion of the upright stems 14 and 15 from the track 3 which carries the connector base 12, as shown particularly in FIGS. 3 and 5.

In forming the abutting interconnections between the sides of one beam 4 and the respective ends of second and third beams 5 and 6, the connectors 10 are positioned with its base 12 disposed in the opposing slots which together form the tracks 3 in the sides of the first beam 4 to whcih the beams to be attached will abut. The upright stems 14 and 15 of the connectors 10 are inserted into the tracks 3 of the frame beams 5 and 6.

Once the beams 5 and 6 are properly positioned against the side of the first beam 4 the connector 10 is secured to the first beam 4 with a pair of screws 20. The stems 14 and 15 of the connector are similarly secured to the beams 5 and 6 with screws 21 which are primarily for the purpose of keeping the beams and connector from moving with respect to one another.

I claim:

1. A fastening system for making right angle interconnections between the structural components of a framework comprising;

first and second frame members to be interconnected, each having at least one flat side which carries track means; and "U"-shaped connector means having a flat base and mutually parallel upright stems, where the flat base is engaged by the track means of the first frame member and the upright stems engage the track means of the second frame member.

2. The combination of claim 1 where the track means are disposed below the surface of the side of the frame members.

3. The combination of claim 1 and further including, means interconnecting the flat base to the first member, and means interconnecting the upright stems to the second member.

4. The combination of claim 2 wherein the "U"-shaped connector comprises a rigid ribbon having opposing edges and a clearance notch on each edge of the ribbon at the juncture of the base and each of the upright stems.

5. A fastening system for making right angle interconnections between the structural components of a framework comprising;

first and second frame members to be interconnected, each having, at least two flat mutually parallel sides with each of said flat sides having a longitudinal channel therein and each channel having parallel side walls, with each side wall having mutually opposed longitudinal slots in the side walls, forming a track;

"U"-shaped connector means having a flat base and mutually parallel upright stems, where the base of the connector is disposed within the track forming slots of one of the channels of the first frame member and the upright stems being disposed in the track forming slots of the second frame member.

* * * * *